US005253427A

United States Patent [19]

Bartlett

[11] Patent Number: 5,253,427

[45] Date of Patent: Oct. 19, 1993

[54] MEASURING DEVICE FOR USE IN FURNITURE CONSTRUCTION

[76] Inventor: Elizabeth Bartlett, 64 Melrose Pl., Montclair, N.J. 07042

[21] Appl. No.: 867,351

[22] Filed: Apr. 13, 1992

[51] Int. Cl.[5] .......... G01B 3/30; G01B 3/38; G01B 3/46

[52] U.S. Cl. .......... 33/501.08; 33/501.45; 33/679.1; 33/555.2; 33/563

[58] Field of Search .......... 33/501.01, 501.45, 501.05, 33/501.08, 520, 662, 482, 483, 474, 476, 679.1, 555.1, 555.2, 485, 494, 562, 563, 565

[56] References Cited

U.S. PATENT DOCUMENTS 187,938 2/1977 Towsey .......... 33/679.1 X
489,584 1/1893 Havenger .......... 33/562
644,756 3/1900 Bailey .......... 33/562
697,701 4/1902 Ayer .......... 33/562
743,076 11/1903 Harris .......... 33/465
1,264,519 4/1918 Hinson .......... 33/555.1 X
1,860,174 5/1932 Cronk .......... 33/563
3,381,385 5/1968 Wilber .......... 33/563
3,417,475 12/1968 Vlasaty .......... 33/567 X
4,129,950 12/1978 Weinhaus et al. .......... 33/600

FOREIGN PATENT DOCUMENTS 2586801 3/1987 France .......... 33/563
0439319 12/1935 United Kingdom .......... 33/562

*Primary Examiner*—Thomas B. Will
*Attorney, Agent, or Firm*—Raymond J. Lillie

[57] ABSTRACT

A measuring device, in particular a caning gauge, for determining the size of openings and the distance between two adjacent openings, in an article of furniture, whereby the size of the cane to be used in the caning of the article can be determined. The device also includes indentations which may be utilized to determine if a particular cane is of the desired size. Advantages of the device of the present invention thus include the ability to use a single device to obtain all the measurements necessary to determine the correct size of cane to be used in caning a particular article of furniture.

4 Claims, 1 Drawing Sheet

MEASURING DEVICE FOR USE IN FURNITURE CONSTRUCTION

This invention relates to measuring devices. More particularly, this invention relates to measuring devices used in furniture construction, and in particular in connection with caning.

Caning is a process of hand-weaving furniture which has drilled holes in its framework, and consists of weaving strands of a reed-like material called cane through the drilled holes in the framework to create a desired pattern. Cane is obtained from the outside bark of rattan, a jungle vine found in Indonesia and Malaysia. The outside bark is stripped from the main stem of the rattan plant, and cut into strips of various widths to form cane. The articles of furniture which may be formed by the weaving of cane through holes in a framework include chairs, tables, and cabinets. In general, the cane is cut in seven different sizes: (i) carriage ($1\frac{1}{2}$ mm); (ii) superfine ($1\frac{3}{4}$ mm); (iii) fine-fine (2 to $2\frac{1}{4}$ mm); (iv) fine ($2\frac{1}{2}$ mm); (v) narrow medium ($2\frac{3}{4}$ mm); (vi) medium (3 mm); and (vii) common ($3\frac{1}{2}$ mm), with carriage being the smallest and common being the largest. The size of cane which is used is dependent upon the size of the openings in the framework and the distance between the openings.

It is therefore an object of the present invention to provide a measuring device, or gauge, which enables one to determine readily the size of cane to be employed in caning an article of furniture.

In accordance with an aspect of the present invention, there is provided a measuring device which comprises a top face portion, a bottom face portion, and at least three side face portions. The device also includes at least one protrusion extending distally from one of said at least three side portions. The at least one protrusion has at least one segment of a specified width and shape. The at least one segment is capable of fitting within an opening of a corresponding width and shape. The term "width", as used herein, means the width of any shaped object and including the diameter, of circular, conical, or cylindrical openings. The device also includes at least one indentation in at least one of the said at least three side face panels. The at least one indentation has a specified width and is capable of receiving an object having the specified width. At least one indicia is located on at least one of the top face portion and the bottom face portion, and is adjacent the at least one indentation. The at least one indicia is indicative of the size of the object. Also, the device further includes at least one indicia located on at least one of the top face portion and the bottom face portion for determining a distance between two points of reference, such as, for example, the distance between two openings in an article of furniture.

In one embodiment, the at least one protrusion has a first segment immediately adjacent the side face portion, and at least one additional segment. The first segment has a width greater than that of each of the at least one additional segment(s). In one preferred embodiment, the at least one protrusion includes at least two additional segments, and the width of each of said at least two additional segments decreases as the at least two additional segments progress from proximal to distal in relation to the side face portion.

Preferably, each of the first segment and the at least one additional segment includes an indicia of the width of the first segment and of the at least one additional segment.

In another embodiment, the device includes at least two indentations in at least one of said at least three side face panels.

In yet another embodiment, the device further comprises an indicia of the size of an opening, and such indicia is adjacent the at least one indicia for determining a distance range between two points of reference.

In a further embodiment, the device further comprises an indicia of the width of an object, and such indicia is adjacent the at least one indicia for determining a distance range between two points of reference.

In a most preferred embodiment, the protrusion has four segments, with the segments having widths of 5/16", $\frac{1}{4}$", 3/16", and $\frac{1}{8}$" as the segments progress from proximal to distal with respect to the side face portion. The device also includes seven indentations in one of the side face portions, with each indentation corresponding to one of the seven cane sizes used in caning. Printed on at least one of the top panel and the bottom panel are seven indicia for determining a distance between two adjacent openings in an article of furniture. Also printed adjacent each of these seven indicia are indicia which indicate an opening size, and indicia which indicate a cane size. In such an embodiment, one can determine the opening size, the distance between two adjacent openings, and cane size with a single device.

The invention will now be described with respect to the drawings, wherein.

Figure 1:
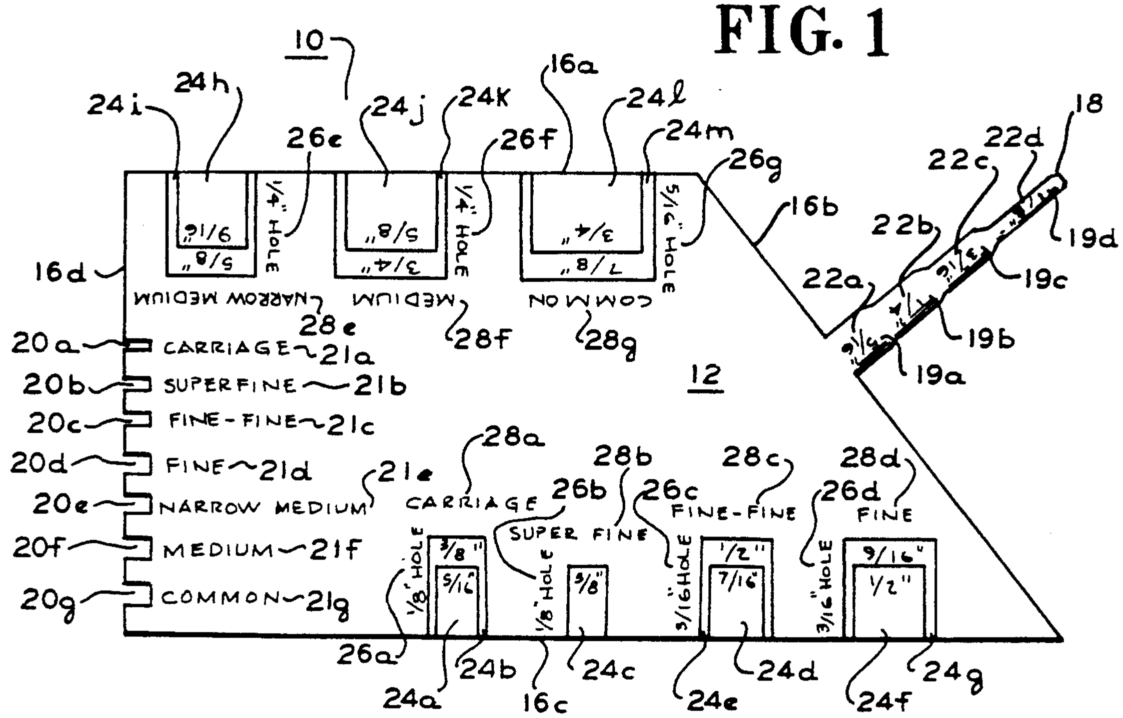
FIG. 1 is a top view of an embodiment of the measuring device in accordance with the present invention.
Figure 2:
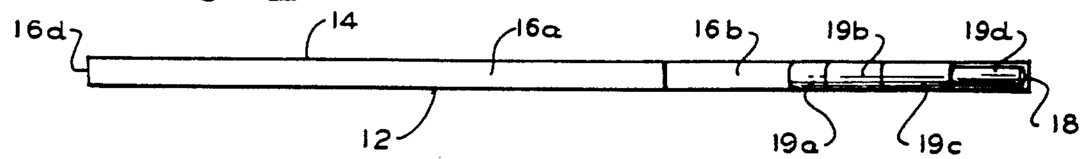
FIG. 2 is a side view of an embodiment of the device.
Figure 3:
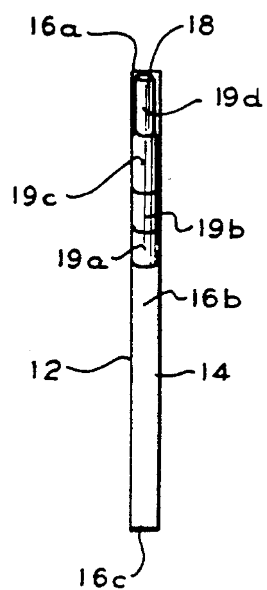
FIG. 3 is a right side view of the device.
Figure 4:
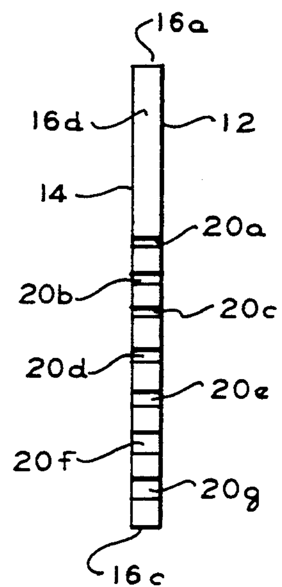
FIG. 4 is a left side view of the device.

Referring now to the drawings, the measuring device or caning gauge 10 includcs a top face 12, a bottom face 14, and side faces 16*a*, 16*b*, 16*c* and 16*d*. Extending from side face 16*b* of caning gauge 10 is protrusion 18, which is employed in determining the width or diameter of an opening. Protrusion 18 includes four segments, 19*a*, 19*b*, 19*c*, and 19*d*. Each segment has an indicia 22*a*, 22*b*, 22*c*, and 22*d*, of the width of the respected segments 19*a*, 19*b*, 19*c*, and 19*d*. It is to be noted that the segments 19*a*, 19*b*, 19*c*, and 19*d* decrease in width as the segments extend outwardly from proximal to distal from side face 16*b*. In diameter, of 5/16", segment 19*b* has a diameter of $\frac{1}{4}$"; segment 19*c* has a diameter of 3/16", and segment 19*d* has a diameter of $\frac{1}{8}$". Thus, protrusion 18 may be inserted into an opening in an article of furniture until one of segments 19*a* through 19*d* fits snugly within the opening. By referring to the indicia 22*a*, 22*b*, 22*c*, or 22*d*, of the segment which fits snugly within the opening, one then can determine the width or diameter of the opening.

Side face 16*d* includes indentations 20*a*, 20*b*, 20*c*, 20*d*, 20*e*, 20*f*, and 20*g*, which are of various widths which correspond to various widths of the cane. Printed on top face 12, and adjacent each of indentations 20*a* through 20*g* are indicia 21*a*, 21*b*, 21*c*, 21*d*, 21*e*, 21*f*, and 21*g*. Each of these indicia refers to a particular size name of cane of a specified width. Indicia 21*a* is carriage ($1\frac{1}{2}$ mm); indicia 21*b* is superfine ($1\frac{3}{4}$ mm); indicia 21*c* is fine-fine (2 to $2\frac{1}{4}$ mm); indicia 21*d* is fine ($2\frac{1}{2}$ mm); indicia 21*e* is narrow medium ($2\frac{3}{4}$ mm); indicia 21*f* is medium (3 mm); and indicia 21*g* is common ($3\frac{1}{2}$ mm).

Also printed on top face 12 are distance indicia 24*a* through 24*m*. With the exception of distance indicia 24*c*, indicia 24*a* through 24*m* are grouped in pairs so as to illustrate a range for a distance between two openings. For example, distance indicia 24*a* is 5/16″ wide, while distance indicia 24*b* is ⅜″ wide, and thus distance indicia 24*a* and 24*b* define a distance range from 5/16″ to ⅜″. Distance indicia 24*c* has a width of ⅜″; distance indicia 24*d* and 24*e* define a distance range from 7/16″ to ½″; distance indicia 24*f* and 24*g* define a distance range from ½″ to 9/16″; distance indicia 24*h* and 24*i* define a distance range from 9/16″ to ⅝″; distance 24*j* and 24*k* define a distance range from ⅝″ to ¾″, and distance indicia 24*l* and 24*m* define a distance range from ¾″ to ⅞″.

Adjacent the distance indicia and printed on top face 12, are opening size indicia 26*a* through 26*g*, each of which is indicative of the width or diameter of an opening into which protrusion 18 has been inserted. Each of opening indicia 26*a* and 26*b* is indicative of a ⅛″ hole. Each of opening size indicia 26 and 26*d* is indicative of a 3/16″ hole. Each of opening size indicia 26*e* and 26*f* is indicative of a ¼″ hole. Opening size indicia 26*g* is indicative of a 5/16″ hole.

Also printed on top face 12 and adjacent the distance indicia are cane size indicia 28*a* through 28*g*, which correspond to indicia 21*a* through 21*g*, respectively.

The device 10 is employed for the selection of the proper cane to be used in caning an article of furniture. Protrusion 18 is inserted into an opening or hole in the article of furniture until one of the segments 19*a* through 19*d* fits snugly within the opening or hole. The indicia of the width or diameter of the hole or opening is then read, such indicia being one of indicia 22*a*, 22*b*, 22*c* or 22*d*. Then the distance indicia 24*a* through 24*m* are placed next to two adjacent holes in the furniture to determine an approximate distance between the holes. Once the width or diameter of a single hole and the approximate distance between two adjacent holes are determined, the indicia or the width or diameter of the hole and the indicia of the approximate distance between holes are matched with the appropriate cane size indicia to determine the size of the cane to be employed in the caning of the article of furniture. For example, if the hole has a width or diameter of ⅛″, and the distance between the two adjacent holes is between 5/16″ and ⅜″, the cane of the carriage size will be used.

Once the size of the cane is determined, one refers to one of the indicia 21*a* through 21*g* which refers to the correct cane size, and to one of the indentations 20*a* through 20*g* into which the correct cane will fit. Thus, if one needs to use cane of the carriage size, one refers to indicia 21*a* and indentation 20*a*, and attempts to insert cane into indentation 20*a* until one finds a cane which fits correctly into indentation 20*a*. When such a cane is found, then such cane may be used for the caning of a particular article of furniture.

Advantages of the present invention include the ability to determine the size of the cane to be employed in the caning of a particular article of furniture by using a single measuring device. By employing the device of the present invention, one can measure the width or diameter of the openings or holes in an article of furniture, and can determine the distance between two adjacent openings or holes with the same device. One may then use the device to determine the size of the cane to be employed, and can determine whether the cane is of the desired size. Thus, the device of the present invention enables one to save time and effort in determining the correct size of the cane to be used in a caning procedure.

It is to be understood, however, that the scope of the present invention is not to be limited to the specific embodiments described above. The invention may be practiced other than as particularly described and still be within the scope of the accompanying claims.

What is claimed is:

1. A measuring device for use in the construction of furniture, comprising:

a top face portion;

a bottom face portion;

at least three side face portions;

at least one protrusion extending distally from one of said at least three side face portions, said at least one protrusion having a first segment immediately adjacent said side face portion and at least two additional segments, wherein the first segment has a width greater than that of the at least two additional segments, and wherein the width of each of said at least two additional segments decreases as said at least two additional segments progress from proximal to distal in relation to said side face portion, each of said first segment and said at least two additional segments capable of fitting within an opening of a corresponding width and shape, each of said first segment and said at least two additional segments including an indicia of the width of said first segment and said at least two additional segments;

at least two indentations in at least one of said at least three side face portions, each of said at least two indentations having a specified width and capable of receiving a strand of cane having said specified width;

at least two indicia located on at least one of said top face portion and said bottom face portion, and each of said at least indicia being adjacent one of said at least two indentations, each of said at least two indicia being indicative of the size of a strand of cane received by one of said at least two indentations;

at least one indicia means located on at least one said top face portion and said bottom face portion for determining a distance range between two points of reference;

at least one indicia means indicative of the size of an opening, said at least one indicia means indicative of the size of an opening being adjacent to one of said at least one indicia for determining a distance range between two points of reference; and at least one indicia means indicative of the size of a strand of cane, said at least one indicia means indicative of the size of a strand of cane being adjacent to one of said at least one indicia for determining a distance range between two points of reference, and wherein each of said at least one indicia means indicative of the size of a strand of cane corresponds to a corresponding indicia means indicative of the size of an opening and corresponds to a corresponding indicia means for determining a distance range between two points of reference.

2. The device of claim 1 wherein said at least one protrusion has a first segment immediately adjacent said side face portion and three additional segments.

3. The device of claim 1 wherein said device has seven indentations in at least one of said at least three side face portions, each of said seven indentations having a specified width and capable of receiving a strand of cane having said specified width, and said device has seven indicia located on at least one of said top face portion and said bottom face portion, and each of said seven indicia is adjacent to one of said seven indentations, each of said seven indicia is indicative of the size of a strand of cane received by one of said seven indentations.

4. The device of claim 1 wherein said device includes seven indicia means located on at least one of said top face portion and said bottom face portion for determining a distance range between two points of reference; seven indicia means indicative of the size of an opening, each of said seven indicia means indicative of the size of an opening is adjacent to one of said seven indicia for determining a distance range between two points of reference; and seven indicia means indicative of the size of a strand of cane, and each of said seven indicia means indicative of the size of a strand of cane is adjacent to one of said seven indicia for determining a distance range between two points of reference, and wherein each of said seven indicia of the size of a strand of cane corresponds to a corresponding indicia means indicative of the size of an opening and a corresponding indicia means for determining a distance range between two points of reference.

* * * * *